United States Patent Office 3,301,269
Patented Jan. 31, 1967

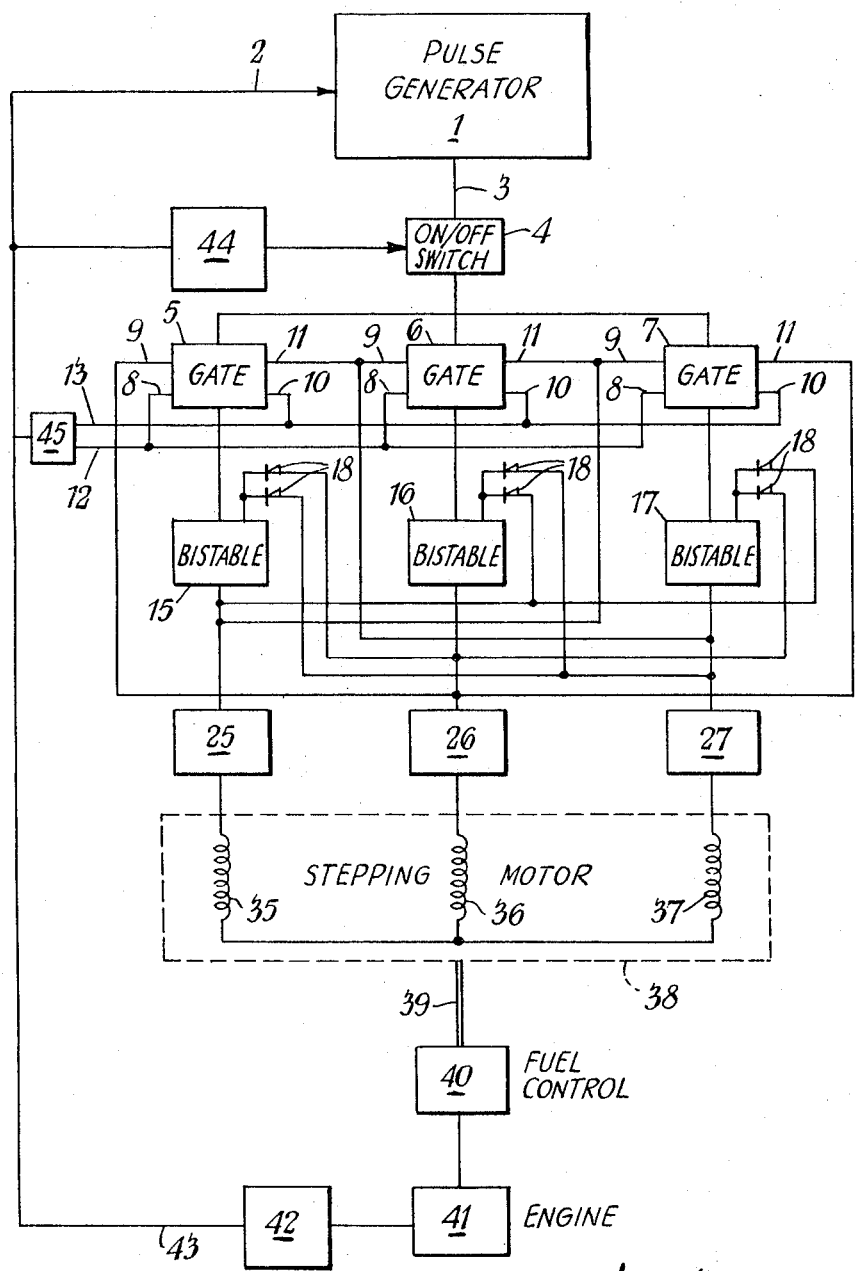

3,301,269
ENGINE CONTROL EMBODYING A MULTIPLE
PULSE TRAIN GENERATOR
Charles T. Marwood, Welwyn Garden City, England, assignor to The De Havilland Aircraft Company Limited, Hatfield, England, a company of Great Britain
Filed Nov. 12, 1963, Ser. No. 322,868
Claims priority, application Great Britain, Nov. 12, 1962, 42,659/62
9 Claims. (Cl. 137—30)

This invention relates to improvements in pulse train generators and is particularly concerned with such generators for deriving a multiplicity of pulse trains from a single pulse train.

According to the present invention, a multiple pulse train generator comprises a plurality of gates corresponding in number to the number of pulse trains to be generated and effectively connected in a ring, at least two pairs of inputs associated with each gate and operable upon simultaneous energisation of two inputs of a pair to enable the associated gate, means for sequentially enabling said gates selectively in either one of the two directions around the ring and means for applying a generated pulse train simultaneously to said gates where by each gate, when enabled, produces an output pulse corresponding to a pulse in the applied generated pulse train and hence each gate produces an output pulse train the phase of which relative to the output pulse trains of the other gates is determined by the direction in which said gates are sequentially enabled.

Preferably one input of one pair of inputs of each gate is connected to a first control line, one input of the other pair of inputs of each gate is connected to a second control line, a separate bistable device is associated with each gate and connected to the output thereof to be switched from the one stable condition to the other stable condition when an output pulse is produced by the associated gate to produce a corresponding output pulse at the output of the bistable device, the bistable device being connected in a ring and having an input connected to the output of each adjacent bistable device in the ring so as to be caused to assume the one condition when such adjacent device assumes the other condition, the output of each bistable device being connected to the other input of the one pair of inputs of the gate associated with the adjacent bistable device in one direction in the ring and also connected to the other input of the other pair of inputs of the gate associated with the adjacent bistable device in the direction opposite to said one direction in the ring.

The invention also extends to a multiple pulse train generator according to the immediately preceding paragraph in combination with a stepping motor arranged to be driven by the outputs from the respective bistable devices.

Advantageously, there is provided a pulse generator for applying the generated pulse train simultaneously to said gates which pulse generator has a repetition frequency which is variable as a function of the departure of an externally derived parameter from a datum value such that the stepping motor is driven at a rate which is a function of the magnitude of such departure.

Desirably, means is provided responsive to the sense of such departure to apply a control signal to one of said first and second control lines to drive said motor in a direction corresponding to the sense of such departure.

The invention is of particular application to an engine control system in which the externally derived parameter is a function of an engine condition and the stepping motor is operable to control the fuel supply to the engine in the sense to reduce the magnitude of said departure.

One embodiment of the invention will now be described by way of example, reference being made to the accompanying block schematic circuit diagram.

The multiple pulse train generator of this example is intended for use in an aircraft engine control system and comprises a pulse generator 1 arranged to generate pulses at a frequency which is a function of the magnitude of an input signal applied along an input line 2. The generated pulse train is applied along output line 3 through an ON/OFF switch 4 to three gates 5, 6 and 7. Each gate has two pairs of inputs 8, 9 and 10, 11, each input 8 being connected to what is termed a "forward drive line" 12 and each input 10 being connected to what is termed a "reverse drive line" 13. Each gate 5, 6 and 7 is such as to produce an output pulse corresponding to an applied input pulse from the oscillator 1 only when a signal is also simultaneously applied to the two inputs of either pair of inputs, i.e., only when an input signal is simultaneously applied to inputs 8 and 9 or to inputs 10 and 11. The output of each gate is supplied to an associated bistable device, the devices being indicated at 15, 16 and 17 and being respectively associated with gates 5, 6 and 7. The devices 15, 16 and 17 are effectively connected in a ring with their outputs connected to the input 9 of the gate associated with the adjacent device considered in one direction around the ring and to the input 11 of the gate associated with the adjacent device considered in the opposite direction around the ring. Thus, for example, the output of the device 15 is connected to the input 9 of the gate 7 and the input 11 of the gate 6. The output of each device is further supplied to each adjacent bistable device in the ring through diodes 18.

Each device 15, 16 and 17 is such that it is switched from one stable condition to the other, e.g. from the "0" to the "1" condition by a pulse from the associated gate and is switched from the other to the one stable condition, e.g. from the "1" to the "0" condition by a pulse through the diodes 18 from the adjacent device.

In the operation of the multiple pulse train generator thus far described, assuming that the switch 4 is in the ON or conducting condition, the generated pulse train from the oscillator 1 is applied simultaneously to the gates 5, 6 and 7. One of the drive lines 12 and 13 is energised. Assume that it is the forward drive line 12 which is energised so that there is an input signal applied to each input 8 and assume that the device 16 is in the "1" condition so that the input 9 of that gate 5 is energised as well as the associated input 8. The next pulse from the oscillator is thus enabled to pass through the gate 5 to the associated device 15 which changes from the "0" to the "1" condition and passes an output to the associated amplifier 25 whilst at the same time switching the device 16 from the "1" to the "0" condition and energising the input 9 of the gate 7. The next pulse from the oscillator 1 therefore passes through the gate 7 to the device 17 which is then switched from the "0" to "1" condition and produces an output to the associated amplifier 27 whilst at the same time switching the device 15 to the "0" condition and energising the input 9 to the gate 6. The devices 15, 16 and 17 are thus switched in the sequence 15, 17, 16 with corresponding outputs. The changing states of the bistable devices for the condition in which the drive line 12 is energised is shown in the following table.

BISTABLE DEVICES

| 15 | 16 | 17 |
|----|----|----|
| 0  | 1  | 0  |
| 1  | 0  | 0  |
| 0  | 0  | 1  |
| 0  | 1  | 0  |
| 1  | 0  | 0  |
| 0  | 0  | 1  |
| 0  | 1  | 0  |

For reverse drive, the drive line 13 is energised supplying an input signal to the inputs 10 of the gates. Assuming the device 16 to be in the "1" condition, there will be an input signal to the input 11 of the gate 7 and the latter will pass the next pulse from the oscillator 1 to the device 17 switching the latter to the "1" condition and resulting in the device 16 being switched to the "0" condition and an input signal appearing at the input 11 of gate 5 to enable the latter readiness for the next oscillator pulse. The sequence of switching in this case is devices 16, 17, 15 and is the reverse of that previously described.

It will be observed that the pulse train from the generator 1 is effectively divided by the gates into a corresponding number of pulse trains, in this example three, and that the outputs from the bistable devices represent a corresponding number of pulse trains the relative phases of which depend on which of the drive lines 12 and 13 is energised and the pulse repetition frequency of which is proportional to that of the pulse train generated by the generator 1.

In its application to an engine control system, the outputs from the bistable devices 15, 16 and 17 are supplied through respectively associated current amplifiers 25, 26 and 27 to respective stator windings 35, 36 and 37 of a stepping motor 38. The stepping motor 38, through output shaft 39, controls the operation of fuel control means 40, e.g. a fuel control valve, the fuel supply to the engine indicated at 41. Suitable comparator means 42 measures a selected engine parameter, e.g. engine speed and compares this with a datum value (which may itself be variable as a function of one or more engine parameters, e.g. temperature) to provide an output signal along line 43 the magnitude of which represents the magnitude of the departure of the selected parameter from the datum valve. This output signal is applied through input line 2 to the pulse generator 1 so that the output thereof has a repetition frequency which is a function of the magnitude of the departure referred to. The output signal along line 43 is also applied to a further comparator 44 which compares the magnitude of the output signal with a selected threshold value (which may also be variable as a function of one or more engine parameters) to control the operation of the switch 4 such that the latter is only in the ON or conducting condition when the selected threshold value is exceeded. The polarity of the output signal 43 is sensed by a device 45 to energise one or other of the drive lines 12 and 13 in accordance with such polarity.

In the operation of the system described, the outputs of the bistable devices 15, 16 and 17 are applied through the associated amplifiers 25, 26 and 27 to the associated stator windings 35, 36 and 37 to advance the stepping motor 38 at a rate which is a function of the magnitude of the input signal along line 2 and hence of the magnitude of the departure of the selected engine parameter from the datum value and in a direction which depends upon the energisation of the drive lines 12 and 13 and hence on the polarity of output signal along line 43 which in turn depends on the sense in which the selected engine parameter departs from the datum value. The fuel supply to the engine is thus varied by the motor 38 at a rate which is a function of the magnitude of the departure of the selected engine parameter from the datum value and in the sense to reduce the magnitude of such departure.

It will be appreciated that no operation of the stepping motor 38 can take place unless the switch 4 is in the ON condition, i.e. the magnitude of the output signal along line 43 exceeds the selected threshold value.

I claim:

1. A multiple pulse train generator comprising a plurality of gates corresponding in number to the number of pulse trains to be generated and effectively connected in a ring, at least two pairs of inputs associated with each gate and operable upon simultaneous energisation of two inputs of a pair to enable the associated gate, means for sequentially enabling said gates selectively in either one of the two directions around the ring and means for applying a generated pulse train simultaneously to said gates whereby each gate, when enabled, produces an output pulse corresponding to a pulse in the applied generated pulse train and hence each gate produces an output pulse train the phase of which relative to the output pulse trains of the other gates is determined by the direction in which said gates are sequentially enabled.

2. A multiple pulse train generator according to claim 1 in which one input of one pair of inputs of each gate is connected to a first control line, one input of the other pair of inputs of each gate is connected to a second control line, a separate bistable device is associated with each gate and connected to the output thereof to be switched from the one stable condition to the other stable condition when an output pulse is produced by the associated gate to produce a corresponding output pulse at the output of the bistable device, the bistable devices being connected in a ring and having an input connected to the output of each adjacent bistable device in the ring so as to be caused to assume the one condition when such adjacent device assumes the other condition, the output of each bistable device being connected to the other input of the one pair of inputs of the gate associated with the adjacent bistable device in one direction in the ring and also connected to the other input of the other pair of inputs of the gate associated with the adjacent bistable device in the direction opposite to said one direction in the ring.

3. A multiple pulse train generator according to claim 2 in combination with a stepping motor arranged to be driven by the outputs from the respective bistable devices.

4. A multiple pulse train generator according to claim 3 including a pulse generator for applying the generated pulse train simultaneously to said gates which pulse generator has a repetition frequency which is variable as a function of the departure of an externally derived parameter from a datum value such that the stepping motor is driven at a rate which is a function of the magnitude of such departure.

5. A multiple pulse train generator according to claim 4 in combination with means responsive to the sense of such departure to apply a control signal to one of said first and second control lines to drive said motor in a direction corresponding to the sense of such departure.

6. A multiple pulse train generator according to claim 5 including a switch device connecting the pulse generator to said gates and operable in response to said departure exceeding a predetermined threshold value to connect said pulse generator to said gates and to isolate said pulse generator from said gates upon said departure falling below said threshold value.

7. An engine control system embodying a multiple pulse train generator according to claim 5, wherein the externally derived parameter is a function of an engine condition and the stepping motor is operable to control the fuel supply to the engine in the sense to reduce the magnitude of said departure.

8. A generator for generating a plurality of cyclically phase-displaced pulse-trains from a single pulse-train, the generator comprising a plurality of normally closed gates equal in number to the number of the said phase-displaced pulse-trains to be generated and intended to be opened in cyclic succession, a first electric circuit for supplying the said single pulse-train to the inputs of said gates, a separate corresponding bistable device associated with each said gate and connected to the output of the corresponding gate whereby said corresponding gate, when it is open and receives a pulse of the said single pulse-train, delivers a corresponding output pulse to the corresponding one of said bistable devices to place that bistable device in one of its two conditions, a second electric circuit so interconnecting said bistable devices that only one of said bistable devices can be in the said one condition at any time, and a third electric circuit connecting each said bistable device with the next said gate in said cyclic succession to tend to open that gate when that bistable device assumes its said one condition, said bistable devices being arranged to give electrical output signals when they are in one of their said two conditions, said electrical output signals constituting said plurality of cyclically phase-displaced pulse-trains.

9. A generator according to claim 8, wherein each of said gates has first and second pairs of auxiliary inputs and is arranged to be opened upon simultaneous electrical energization of the two inputs of a selected one pair of said first and second pairs of auxiliary inputs, said third electric circuit being so arranged that when one of said bistable devices is in its said one condition it supplies an electrical signal to electrically energize one input of said first pair of auxiliary inputs of the next said gate in said cyclic succession in one of the two possible directions of said cyclic succession and to electrically energize one input of said second pair of auxiliary inputs of the next said gate in said cyclic succession in the other of said two possible directions of said cyclic succession, said generator including electrical apparatus for selectively electrically energizing the other input of said first pair of inputs of all of said gates and the other input of said second pair of inputs of all of said gates to thereby select one of said two possible directions of cyclic succession of opening of said gates.

References Cited by the Examiner

UNITED STATES PATENTS

| | | | |
|---|---|---|---|
| 2,829,662 | 4/1958 | Carey | 137—36 |
| 2,876,004 | 3/1959 | Sink | 317—5 X |
| 2,919,384 | 12/1959 | Guarino | 317—5 |
| 2,926,524 | 3/1960 | Saunders. | |
| 3,091,933 | 6/1963 | Wagner | 137—29 X |
| 3,119,055 | 1/1964 | Martin | 317—5 X |
| 3,201,572 | 8/1965 | Yetter | 137—30 X |

WILLIAM F. O'DEA, *Primary Examiner.*